ADDRESSING AN OPERATING MEMORY OF A DIGITAL COMPUTER SYSTEM

Filed June 10, 1968

Inventor:
Alwin Kröck
By: Spencer & Kaye
Attorneys

United States Patent Office 3,553,653
Patented Jan. 5, 1971

3,553,653

ADDRESSING AN OPERATING MEMORY OF A DIGITAL COMPUTER SYSTEM

Alwin Kröck, Zellhausen, Germany, assignor to Licentia Patent-Verwaltungs-G.m.b.H., Frankfurt am Main, Germany Filed June 10, 1968, Ser. No. 735,905
Claims priority, application Germany, June 9, 1967, L 56,702
Int. Cl. G11c *7/00*
U.S. Cl. 340—172.5 6 Claims

ABSTRACT OF THE DISCLOSURE

In a digital data processing system arranged to operate with instruction words having an address portion consisting of a given number of bits, which system includes an operating memory having a number of address locations which is greater than the number of locations which can be addressed by an instruction word address portion, a method and apparatus for permitting any group of operating memory address locations to be addressed by the instruction word address portion by dividing the operating memory into a plurality of sections all of the address locations of which can be addressed by a number of bits which is less than that contained in the instruction word address portion, delivering that number of bits of the instruction word address portion directly to the operating memory, logically combining the remaining bits of the instruction word address portion with a predetermined status word to form a status address portion, and delivering such status address portion to the operating memory for determining which partial section of the memory is being addressed by the instruction word.

BACKGROUND OF THE INVENTION

The present invention relates to digital data processing systems, and particularly to the extraction of stored information from the operating memory of such a system.

In process control computers there is a tendency to employ short computer word lengths. This fact becomes clear upon consideration that no matter how accurate the digital portion of the computer, it can not compensate for the inaccurate determination of the measuring value in the analog portion of the system. This entails the necessity of selecting the word length to correspond only to the accuracy of the analog circuits. In practice, the word length will be an integral multiple of the length of an alpha-numeric character. When the alphanumeric character has a length of 6 or 8 digits, for example, this results in a typical computer word length of 12, 16, 18 or 24 bits.

In such computers, the instruction word length is, if possible, one or at most two word lengths of the computer word so that many instructions and, equally significantly, extensive programs can be stored in the operating memory of the computer. The operation to be performed must be coded in the instruction word, or operation code. In the case of computation and transfer instructions, there must be at least one address for the operand, with one or a plurality of further binary digits in the instruction word being generally reserved for the indication of an address modification. This results in limiting the length of the address portion itself.

Current practice requires, particularly in process control systems, that a number of programs be simultaneously available in the operating memory. On the other hand, programs have recently become more and more expanded due to the use of programming aids, or compilers, which can generally not produce optimum programs and due to the extensive number of problems to be solved.

The direct consequence of these developments is that the operating memory sections which can be addressed by the address portion of the instruction are often too small to satisfy current requirements.

Several known suggested solutions to the above-described problem will be briefly described below, together with their drawbacks.

A first solution provides for an expansion of the address portion by address modification. The modifications are here accomplished in a known manner by relativation, indexing, or substitution. An effective address is produced, for example, by adding the contents of the index register to the address portion of the instruction, the index register here having more bit locations than the address portion of the instruction. The drawback of this known address expansion technique is that an expansion is possible only until the length of the address portion becomes equal to the computer word length. With a word length of 12 bits, an operating memory containing 4096 different words could be addressed by this method and in many cases this would not suffice.

A second known solution provides an expansion of the addresses by shifting the contents of the operating memory to a second operating memory under the control of preliminary instructions, this second operating memory having the same capacity as the first memory. The disadvantage of this solution is that transfer between the two operating memories is very difficult from the programming standpoint. An additional operating memory furthermore entails additional expenditures.

A third solution provides, during expansion by means of relativation or indexing, an additional expansion of the instruction sequence counter or of the index register by several binary locations. Such a measure requires special instructions which complicate the control mechanism of the computer and thus make it more expensive. The programs, moreover, become complicated and difficult to prepare.

SUMMARY OF THE INVENTION

It is a primary object of the present invention to overcome these drawbacks and disadvantages.

Another object of the invention is to expand the number of operating memory address locations which can be addressed by a given instruction word address portion.

Yet another object of the invention is to simplify the generation of the operating memory address.

Yet another object of the invention is to vary the portion of an operating memory which can be addressed by a given instruction word address portion.

These and other objects according to the invention are achieved by the provision of a method for addressing an operating memory in a digital data processing system employing instruction words having an address portion composed of a given number of bits, the operating memory being arranged to receive an address having more bits than the instruction word address portion and being divided into a plurality of partial sections each containing a given number of address locations. The method according to the invention is carried out by delivering less than all of the bits of the instruction word address portion to the memory to form a first part of the operating memory address, providing a predetermined multibit status word, logically combining the status word with the remaining bits of the instruction word address portion to form a status address portion having a number of bits equal to the difference between the number of bits of the address which the memory is arranged to receive and the number of bits forming the first part of the operating memory address, and delivering the status address portion to the memory to form a second part of the memory address that determines which partial section of the memory is being addressed.

The objects according to the invention are also achieved by the provision, in a digital data processing system employing instruction words having an address portion composed of $n$ bits and including an operating memory arranged to receive an address having $m$ bits, $m$ being greater than $n$, wherein such memory is divided into a plurality of partial sections each containing a given number of address locations, of an operating memory address-generating device. The device according to the invention includes an arithmetic unit for providing the $n$ bits of an instruction word address portion, first conductor means connected between the arithmetic unit and the memory for delivering the lower $k$ bits of such instruction word address portion to the memory, $k$ being less than $n$, to constitute the lower $k$ bits of the memory address, and a decoding circuit having inputs connected to receive the remaining $n-k$ bits of such instruction word address portion. The device according to the invention further includes register means for providing a predetermined status word, status address portion-generating means composed of a plurality of AND-OR stages having inputs connected to the register means and to the outputs of the decoding circuit for producing a status address portion having $m-k$ bits, and second conductor means connected between the generating means and the memory for delivering the bits of the status address portion to the memory to constitute the higher $m-k$ bits of the memory address. When such an arrangement is provided, the higher $m-k$ bits of the memory address designate a particular partial section of the memory and the lower $k$ bits of the memory address designate a particular address location in such partial section.

In advantageous manner, additional bits of the status word can be used to program a writing-in blockage for each partial section. Thus, there are a total of three modes of operation for each partial section: writing-in and reading-out; reading-out only; and no access.

Such a writing blockage is of particular interest when a plurality of programs are stored in the operating memory and when some of these programs are particularly important. These important programs must then be protected against accidental erasure.

According to a further feature of the invention, the operating memory is subdivided into a number of partial sections of equal size, i.e., an equal number of address location. One part of the address portion of the instruction word addresses a whole-number multiple of one partial section. The partial sections are thus predetermined and can not be changed. The remaining partial sections are selected by the status word. In this manner a fixed operating memory is provided which is available, for example, for operational programs that are always needed. On the other hand, the status word can advantageously be kept short.

The advantage of the invention lies essentially in that its application does not require an alteration of the existing computer structure, and particularly of the control mechanism.

The practical advantage resulting for the programmer from the application of the invention is that he can develop his programs as if he had operating memory corresponding to the size of the instruction word address portion and another large-capacity memory from which he can transfer blocks of the length of the partial sections in a very short time—corresponding to the processing time of the read-out instruction—into the operating memory.

DESCRIPTION OF THE PREFERRED EMBODIMENTS

Figure 1:
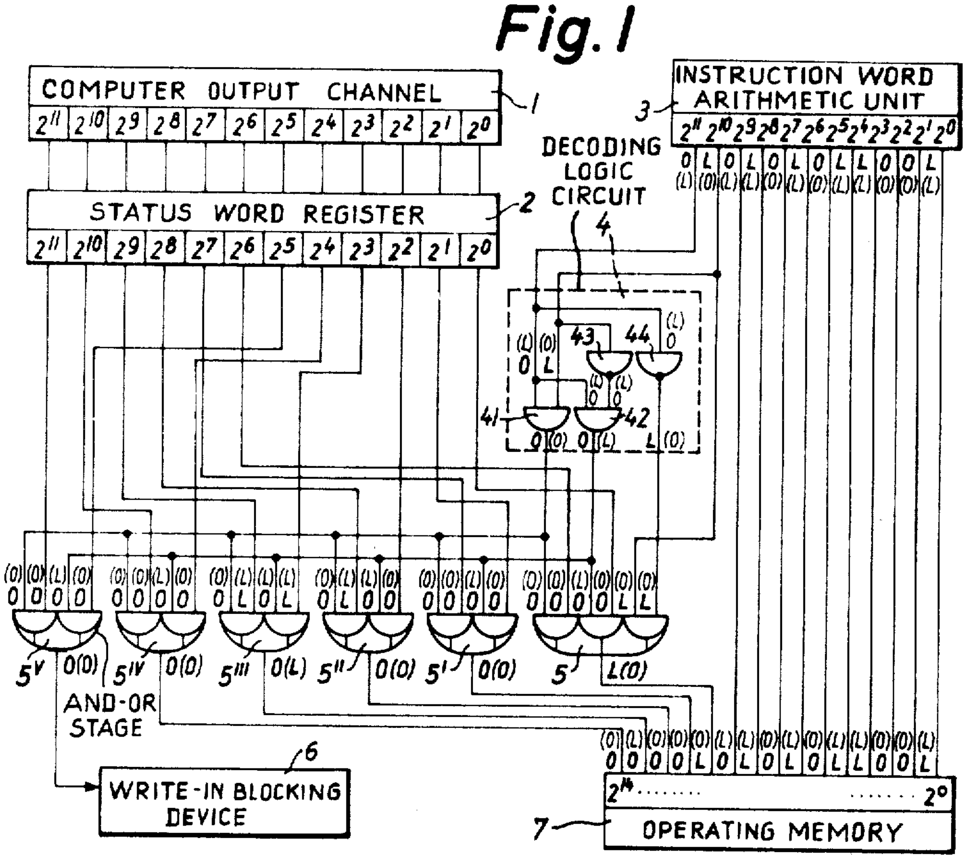
FIG. 1 is a block diagram showing one embodiment of the invention.

FIG. 1 shows portions of a computer having a word length of 12 bits and connected to effect parallel transfers of the bits of each word. In the illustrated example, the computer has a double word structure, i.e., the operation portion of an instruction and the address portion of the instruction each has a length of 12 bits. Since the arithmetic unit 3 can accommodate only a word length of 12 bits, each instruction word is subjected to a time multiplex division process to enable the word to be suitably handled. First the address portion of the instruction is fed to arithmetic unit 3 and the first 10 bits ($2^0 \ldots 2^9$) of the address portion issued by the arithmetic unit 3 directly address corresponding bit locations of the operating memory 7, which memory has 15 bit locations.

To provide the 11th–15th bits of the operating memory address, the 11th and 12th bits of the address portion of the instruction stored in arithmetic unit 3 are first fed into a decoding logic circuit 4. This decoding circuit 4 consists of two AND-stages 41 and 42 each having two inputs and two inverter stages 43 and 44.

The 12th bit ($2^{11}$) of the address portion of the instruction coming from the arithmetic unit 3 is applied to one input each of the AND-stages 41 and 42. The 11th bit ($2^{10}$) of the instruction in the arithmetic unit is sent directly to the second input of the AND-stage 41 and to the second input of the AND-stage 42 via the interposed inverter stage 43.

The outputs of the AND-stages 41 and 42 are connected to the inputs of subsequent AND-OR-stages 5, $5^I$, $5^{II}$, $5^{III}$, $5^{IV}$ and $5^V$. Each of the AND-OR-stages $5^I$ to $5^V$ consists of two AND-components each having two inputs and an OR-component having two inputs connected to the AND-component outputs. The first input of one AND-component of each stage $5^I$ to $5^V$ is connected to the output of the AND-stage 41 of the decoding logic circuit 4, while the first input of the other AND-component of each stage $5^I$ to $5^V$ is connected to the output of AND-stage 42. The second input of each AND-component is connected to a respective one of the 12 outputs of a register 2 containing the status word.

The status word has a word length of 12 bits. It is predetermined by the program and is present at the output channel 1 of the computer.

The first AND-OR stage 5 is provided, in contrast to the subsequent stages, with three AND-components at its input. Two of these AND-components are connected in the same manner as the AND-components in the subsequent AND-OR-stages $5^I$ to $5^V$. The third AND-component is controlled directly by the 11th bit of the address portion of the instruction provided by the arithmetic unit 3 and by the negated 12th bit of the address portion. The negation of the 12th bit is produced by the inverter stage 44. The 11th bit of the address sent to the operating memory 7, which is furnished by the output of the AND-OR-stage 5, is thus also directly derived, in a way, from the address portion of the instruction.

In the AND-OR-stage $5^I$ to $5^{IV}$, the corresponding portions of the status word are logically linked with the two highest coded bits of the address part of the instruction and result in the 12th to 15th bits of the operating memory address. The AND-OR-stage $5^V$ links the 6th and 12th bits of the status word with the two highest coded bits of the address portion of the instruction and derives therefrom a writing stop command, if required.

The AND-OR-stage $5^V$ is connected to a write-in blocking device 6 which can be connected in a known manner to prevent the writing-in of new information, or program, words to selected partial sections of the memory, thus assuring the preservation of the original contents of those partial sections. This could be accomplished, for example, by constructing blocking device 6 of an AND switch having one input connected to receive the computer write-in signal and a second input connected to the output of stage 5$^V$ through an inverter and by connecting the AND switch output to supply an operating signal to all units which cause information to be written into the memory. Thus a signal from stage 5$^V$ will act in a straightforward manner to block the writing-in of information to the memory.

In order to facilitate an understandingg of the invention and of the arrangement illustrated in FIG. 1, two numerical examples for the formation of an expanded effective operating memory address by combining the address portion of the instruction with the status word are given below, the address portion and the status word having been preliminarily formed in some other portion of the computer in a known manner.

"0" in its 12th bit position, so that the address portion relates to operating memory address locations 1024–2047. The construction of the circuit of FIG. 1 is such that no shift to a higher partial section of the memory will be produced, regardless of the particular status word provided, as long as the 12th bit position of the instruction word address portion contains a "0."

However, when, as in Example 2, a "1" is present in the 12th bit position of the instruction word address portion, the situation is entirely different. Then a shift to a higher partial section of the memory can occur, this shift being controlled by the values present in the 11th and 12th bit positions of the instruction word address portion and by the particular status word employed. In Example 2, the values at the 11th and 12th bit positions of the instruction word address portion are such that the address portion originally pertains to the memory partial section containing address locations 2048–3071. However, the particular status word provided results in an effective operating memory address which corresponds

| | Address portion of an instruction | Status word | Effective operating memory address |
|---|---|---|---|
| Example 1 | OLO LOL OLL OOL | OOL LOO OOL OOO | OOO OLO LOL OLL OOL |
| Example 2 | LOL LOL OLL OOL | OOL LOO OOL OOO | OLO OOL LOL OLL OOL |

In FIG. 1 the bit values for Example No. 2 are presented in parentheses to distinguish them from the bits relating to Example No. 1, which are not in parentheses.

In Example 1, the values of the two highest bits of the address portion of the instruction are such that no part of the status word is incorporated into the effective address sent to operating memory 7. The lower 11 bits corresponding to address locations (0–2047) of the address portion of the instruction are delivered directly to the operating memory 7. In contrast thereto, in Example 2, due to the values of the two highest bits of the address portion of the instruction, a portion of the status word is transferred to the effective operating memory address.

Figure 2:
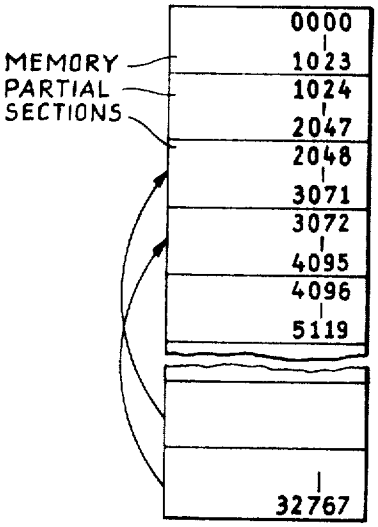
FIG. 2 is a block diagram illustrating the arrangement of one element of the apparatus of FIG. 1.

In FIG. 2 of the attached drawing, in which an example for a memory plan is represented, the addressing method according to the invention shall be once more explained summarily.

The address portion of the instruction has a length of 12 bits, corresponding to a capacity of 0 to 4095 (app. 4000) words. The operating memory has enough bit locations to accommodate 0 to 32,767 (app. 32,000) words, corresponding to an address length of 15 bits. The operating memory is subdivided into 32 partial sections of identical size each containing 1024 words. The first two of these partial sections, corresponding to the words in locations 0 to 2047, for example, can be directly, and thus permanently, addressed by the address portion of an instruction word. The first two partial sections, for example, contain programs which are required quite frequently. The two bits having the highest value locations ($2^{10}$, $2^{11}$) in the address portion of the instruction pertain to the addresses of two further switchable partial sections (word addresses 2048 to 4095).

By use of a status word which is selected by the programmer and which has a word length of 12 bits, inclusive of the bits for a writing blockage command, the programmer has the option of developing his programs as though he had an operating memory of 4096 (app. $4{,}000=4k$) words, corresponding to the address portion of the instruction (12 bits), and a large-capacity memory of $28k$ from which he can transfer, in a very short time, word blocks having the length of the partial sections ($1k \cong 1024$) into the operating memory, the particular blocks transferred depending on the status word selected.

Thus, in the numerical examples presented above, wherein the status word is the same for both examples, the address portion of the instruction word of Example 1 has a binary "1" in its 11th bit position and a binary to the memory partial section containing address locations 8192–9215 (the 9th partial section). Thus, the 9th partial section effectively replaces the 3rd partial section.

Moreover, if a "1" were present in both the 11th and 12th bit positions of the instruction word address portion, the particular status word provided in the examples would have resulted in an effective operating memory address directed to the partial section containing address locations 12288–13311 and hence an effective shift from the 4th partial section to the 13th partial section.

The significant advantage of the above-described method and arrangement is that existing data processing systems can be expanded in the above-described manner without having to alter the structure thereof and particularly the control mechanism of the computer.

It will be understood that the above description of the present invention is susceptible to various modifications, changes and adaptations, and the same are intended to be comprehended within the meaning and range of equivalents of the appended claims.

I claim:

1. In the operation of a digital data processing system, a method for addressing an operating memory having a given number of address locations, the memory being arranged to receive a predetermined number of address bits constituting a first part and a second part of the address, and the memory being divided into at least one first partial section and a plurality of further partial sections, said method comprising the steps of:

providing an instruction word address portion composed of a number of bits less than the predetermined number of bits which the memory is arranged to receive and less than the number of bits required for directly addressing every one of the operating memory locations, the instruction word address portion being composed of a first group of bits for addressing a memory location in any memory partial section, a second group of bits for determining the memory partial section in which a memory location is to be addressed, and a switching bit whose binary value determines whether a location in a first memory partial section or in a further partial memory section is to be addressed;

providing a multi-bit status word at least a portion of which identifies a particular further partial memory section;

delivering to the operating memory, to form the first part of the operating memory address, the first group of instruction word address portion bits, which first group is composed of a number of bits smaller than the predetermined number of address bits which the memory is arranged to receive;

determining the binary value of the switching bit;

selectively delivering the second group of bits of the address portion to the operating memory, to form the second part of the operating memory address for selecting a particular first partial section of the memory in which a location is to be addressed, only when the switching bit has a first binary value; and selectively causing the second group of bits of the address portion to select one particular portion of the status word and delivering such one portion to the operating memory, to form the second part of the operating memory address for selecting a particular further partial section of the memory in which a location is to be addressed, only when the switching bit has a binary value opposite to the first binary value.

2. A method as defined in claim 1 comprising the further step of utilizing at least one bit of the status word for blocking the writing-in of information to at least one partial section of the operating memory.

3. A method as defined in claim 1 wherein said step of providing a status word is carried out by providing a status word whose length is the same as that of each word portion employed in said data processing system and wherein the status word is derived from an output channel of said system.

4. In a digital data processing system employing instruction words having an address portion composed of $n$ bits and including an operating memory arranged to receive an address having $m$ bits, $m$ being greater than $n$, wherein such memory is divided into a plurality of partial sections each containing a given number of address locations, an operating memory address-generating device comprising, in combination:

an arithmetic unit for providing the $n$ bits of an instruction word address portion;

first conductor means connected between said arithmetic unit and said memory for delivering the lower $k$ bits of such instruction word address portion to said memory, $k$ being less than $n$, to constitute the lower $k$ bits of the memory address;

a decoding circuit having inputs connected to receive the remaining $n-k$ bits of such instruction word address portion;

register means for providing a predetermined status word;

status address portion generating means composed of a plurality of AND-OR-stages having inputs connected to said register means and to the outputs of said decoding circuit for producing a status address portion having $m-k$ bits; and second conductor means connected between said generating means and said memory for delivering the bits of the status address portion to said memory to constitute the higher $m-k$ bits of the memory address;

whereby the higher $m-k$ bits of the memory address designate a particular partial section of said memory and the lower $k$ bits of the memory address designate a particular address location in such partial section.

5. An arrangement as defined in claim 4 further comprising a write-in blocking device for preventing the writing-in of information to at least one partial section of said memory, and an additional AND-OR-stage having its inputs connected to said register means and to the outputs of said decoding circuit and its output connected to said blocking device for actuating said blocking device in response to the presence of a particular status word and a particular combination of the remaining $n-k$ bits of such instruction word address portion.

6. An arrangement as defined in claim 4 wherein one of said AND-OR-stages comprises three AND-components at its input, one of said components being directly controlled by the $n-k$ bits of such instruction word address portion, and the other of said components being controlled jointly by such $n-k$ bits and by selected bits of the status word.

References Cited

UNITED STATES PATENTS

| | | | |
|---|---|---|---|
| 3,427,592 | 2/1969 | Bahnsen et al. | 340—172.5 |
| 3,425,039 | 1/1969 | Bahrs et al. | 340—172.5 |
| 3,405,396 | 10/1968 | Mendelson et al. | 340—172.5 |
| 3,380,025 | 4/1968 | Ragland | 340—172.5 |
| 3,331,056 | 7/1967 | Lethin et al. | 340—172.5 |
| 3,315,235 | 4/1967 | Carnevale et al. | 340—172.5 |
| 3,284,778 | 11/1966 | Trauboth | 340—172.5 |
| 3,274,560 | 9/1966 | Granto et al. | 340—172.5 |

GARETH D. SHAW, Primary Examiner